(12) United States Patent
Claire

(10) Patent No.: US 11,675,996 B2
(45) Date of Patent: Jun. 13, 2023

(54) ARTIFICIAL INTELLIGENCE ASSISTED WEARABLE

(71) Applicant: Microsoft Technology Licensing, LLC, Redmond, WA (US)

(72) Inventor: Brian Stephen Claire, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 783 days.

(21) Appl. No.: 16/570,058

(22) Filed: Sep. 13, 2019

(65) Prior Publication Data

US 2021/0081749 A1 Mar. 18, 2021

(51) Int. Cl.
| | |
|---|---|
| *G06N 3/004* | (2023.01) |
| *G10L 15/18* | (2013.01) |
| *G10L 15/22* | (2006.01) |
| *H04R 1/02* | (2006.01) |
| *H04R 1/08* | (2006.01) |
| *G06V 40/16* | (2022.01) |

(Continued)

(52) U.S. Cl.
CPC .......... *G06N 3/004* (2013.01); *G06V 40/172* (2022.01); *G10L 15/1815* (2013.01); *G10L 15/22* (2013.01); *H04N 23/54* (2023.01); *H04R 1/028* (2013.01); *H04R 1/08* (2013.01); *G01S 19/13* (2013.01); *G06F 1/163* (2013.01); *G10L 2015/223* (2013.01)

(58) Field of Classification Search
CPC .. G06N 3/004; G06V 40/172; G10L 15/1815; G10L 15/22; G10L 2015/223; G10L 15/1822; G10L 2015/228; H04N 5/2253; H04R 1/028; H04R 1/08; G01S 19/13; G06F 1/163; G06F 3/167; G06F 16/3329; G06F 3/005; A45C 15/00; A45F 3/04
See application file for complete search history.

(56) References Cited

U.S. PATENT DOCUMENTS

| | | |
|---|---|---|
| 8,362,882 B2 | 1/2013 | Heubel et al. |
| 8,594,845 B1 | 11/2013 | Gharpure |

(Continued)

FOREIGN PATENT DOCUMENTS

WO 2019041327 A1 3/2019

OTHER PUBLICATIONS

"International Search Report and the Written Opinion Issued in PCT Application No. PCT/US2020/038297", dated Dec. 8, 2020, 18 Pages. (MS# 407226-WO-PCT).

(Continued)

*Primary Examiner* — Fernando Alcon

(57) ABSTRACT

The description relates to artificial intelligence assisted wearables, such as backpacks. An example backpack may include sensors, such as a microphone and a camera. The backpack may receive a contextual voice command from a user. The contextual voice command may include a non-explicit reference to an object in an environment. The backpack may use the sensors to sense the environment, use an artificial intelligence engine to identify the object in the environment, and use a digital assistant to perform a contextual task in response to the contextual voice command. The contextual task may relate to the object in the environment. The backpack may output a response to the contextual voice command to the user.

20 Claims, 8 Drawing Sheets

(51) Int. Cl.
*H04N 23/54* (2023.01)
*G01S 19/13* (2010.01)
*G06F 1/16* (2006.01)

(56) References Cited

U.S. PATENT DOCUMENTS

| | | | |
|---|---|---|---|
| 8,964,037 B2 | 2/2015 | Petricoin, Jr. | |
| 9,965,865 B1* | 5/2018 | Agrawal | G06T 7/174 |
| 10,007,897 B2 | 6/2018 | Possing et al. | |
| 10,282,451 B1* | 5/2019 | Ho | G06F 16/24578 |
| 10,540,976 B2* | 1/2020 | Van Os | G06F 3/167 |
| 10,602,823 B1* | 3/2020 | Duncan, Jr. | A45C 13/08 |
| 2011/0205057 A1* | 8/2011 | Sizemore | G08B 15/004 |
| | | | 340/568.6 |
| 2015/0162000 A1 | 6/2015 | Di censo et al. | |
| 2017/0358305 A1* | 12/2017 | Kudurshian | G10L 15/30 |
| 2018/0217810 A1* | 8/2018 | Agrawal | G10L 15/19 |
| 2019/0012714 A1* | 1/2019 | Bright | G06Q 30/0643 |
| 2019/0027147 A1* | 1/2019 | Diamant | G06F 16/532 |
| 2019/0080168 A1* | 3/2019 | Nowak-Przygodzki | |
| | | | G06F 3/0304 |
| 2019/0265750 A1* | 8/2019 | Crowder | G09F 21/026 |
| 2019/0318759 A1* | 10/2019 | Doshi | G10L 15/04 |
| 2020/0184963 A1* | 6/2020 | Joseph | G10L 15/30 |
| 2020/0312318 A1* | 10/2020 | Olson | G10L 15/08 |
| 2021/0029207 A1* | 1/2021 | Crocker | G06F 3/011 |
| 2021/0097977 A1* | 4/2021 | Aher | G10L 15/22 |
| 2021/0097988 A1* | 4/2021 | Aher | G06F 16/951 |
| 2021/0104233 A1* | 4/2021 | Hsu | G10L 15/18 |
| 2022/0188361 A1* | 6/2022 | Botros | G10L 15/16 |
| 2022/0392435 A1* | 12/2022 | Saadatpanah | G10L 15/22 |

OTHER PUBLICATIONS

"Bionik Laboratories Corp. Completes Integration of Amazon Echo into its ARKE Exoskeleton", Retrieved from: https://www.prnewswire.com/news-releases/bionik-laboratories-corp-completes-integration-of-amazon-echo-into-its-arke-exoskeleton-300501030.html, Aug. 8, 2017, 4 Pages.

"The Most Advanced Backpack Ever: Artificial Intelligence and more", Retrieved from: https://www.24-7pressrelease.com/press-release/447066/the-most-advanced-backpack-ever-artificial-intelligence-and-more, Nov. 24, 2017, 5 Pages.

Li, et al., "GumPack: A Personal Health Assistant with Reconfigurable Surface Components", In Journal of Healthcare Engineering, vol. 4, Issue 1, Jan. 1, 2013, pp. 145-166.

* cited by examiner

ARTIFICIAL INTELLIGENCE ASSISTED WEARABLE

BACKGROUND

Digital assistants are becoming more versatile due to advancements in computing. The present concepts relate to improvements in wearable digital assistants that can perform various tasks for the benefit of users.

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. The accompanying drawings are not necessarily drawn to scale. In the figures, the left-most digit of a reference number identifies the figure in which the reference number first appears. The use of similar reference numbers in different instances in the description and the figures may indicate similar or identical items.

DETAILED DESCRIPTION

Figure 1:
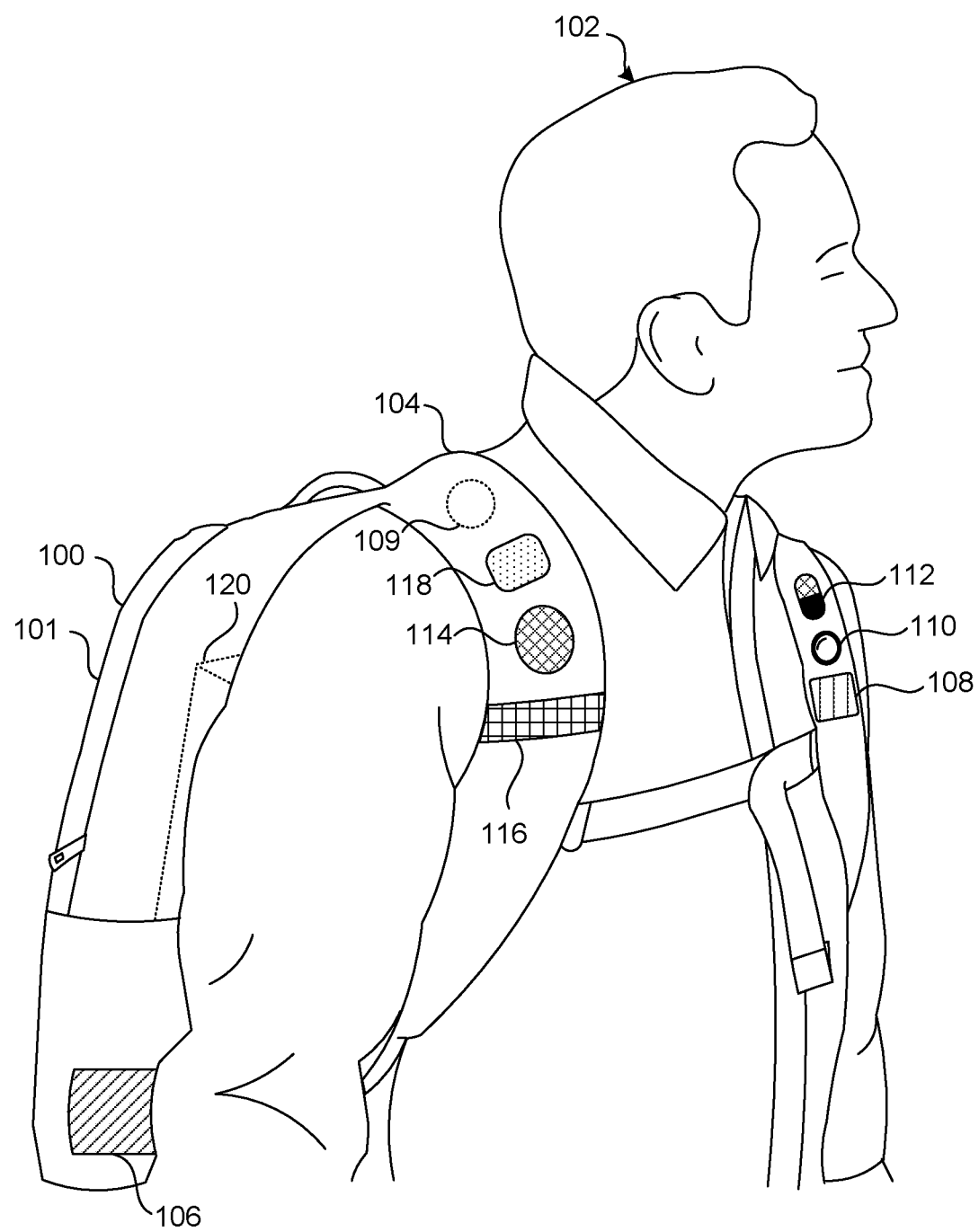
FIG. 1 illustrates an example wearable, consistent with the present concepts.

The present concepts relate to an artificial intelligence assisted smart wearable that can function as a hands-free digital assistant. Moreover, the wearable may be context-aware such that a user can provide contextual commands that relate to the environment in which the user is situated and the wearable can understand the contextual command by sensing the environment and using artificial intelligence.

Continuing advancements in artificial intelligence and the ongoing proliferation of smart devices have made digital assistants more functional and useful. However, conventional digital assistants have several drawbacks.

First, many conventional digital assistants are physically stationary. For example, many homes are equipped with digital assistant devices that can understand voice commands to operate electronic devices in the house. For example, conventional digital assistants can control the lighting, adjust the thermostat, operate televisions, adjust speaker volume, etc. However, the functionality and usefulness of such conventional digital assistants are limited to the home surroundings. Accordingly, such digital assistants are not available or useful when users are on the go or out and about.

Second, many conventional digital assistants that are available on mobile devices, such as smartphones, tablets, and laptops, require the user to divert his attention and focus away from the task at hand, because the mobile devices require manual operation using the user's hands and require the user to look at the mobile device. For instance, user may be required to stop whatever he/she is doing; look for and take out the device from a pocket, purse, backpack, etc.; press buttons or move switches; tap or swipe touchscreens; look at the display and changing graphical user interfaces (GUIs); and/or put the device back into the user's pocket, purse, backpack, etc. These requirements make it difficult to use conventional digital assistants in many circumstances when the user is preoccupied with an ongoing task, the user's hands are occupied, and/or when the mobile device is stowed away. For example, using conventional digital assistants can be inconvenient when the user is skiing while wearing gloves and holding ski poles; when the user is biking and holding the bike handles; or when the user has stowed the device inside a pocket, purse, or backpack.

Third, conventional digital assistants are not context-aware. That is, conventional digital assistants are incapable of perceiving the user's surroundings and thus require the user to provide overly explicit commands. For example, conventional digital assistants cannot see what the user sees and cannot hear what the user hears. Accordingly, the user is required to speak to conventional digital assistants in an unnatural and cumbersome manner, contrary to how the user would normally speak to another person who can perceive the user's surroundings at the same time. Such an unnatural interaction with conventional digital assistants can discourage users from using conventional digital assistants. The lack of contextual information renders conventional digital assistants very difficult or even impossible to use in many scenarios in which the user may wish to perform certain tasks relating to the environment.

The present concepts solve the above-discussed problems associated with conventional digital assistants. First, a digital assistant consistent with the present concepts is available with a wearable that is worn by the user. Second, a user can interact with the digital assistant hands-free using voice commands and one or more of auditory feedback, visual feedback, and/or haptic feedback without distracting the user away from the current task at hand. Third, the digital assistant can perceive the user's surroundings and thus is context-aware, enabling the user to provide contextual commands to the digital assistant.

A digital assistant consistent with the present concepts has several advantages and provides many benefits to the user. The digital assistant can be with the user wherever he/she goes so long as he/she brings the wearable with him/her. The user can conveniently utilize the digital assistant using voice commands and need not free his/her hands or distract his/her eyes from whatever activity he/she is currently engaged in. Furthermore, the user can provide contextual commands that requires some understanding or perception of the environment in which he/she is in, because the digital assistant is capable of sensing and interpreting the user's surroundings. The present concepts allow the user to form commands relating to the environment in a more natural way to cause the digital assistant to perform contextual actions based on the environment around the user.

FIG. 1 illustrates a wearable 100, consistent with the present concepts. In one implementation, the wearable 100 may be a backpack 101 worn on the back of a user 102, as illustrated in FIG. 1. The backpack 101 may include one or more straps 104 so that the backpack 101 can be worn over the shoulders of the user 102, as illustrated in FIG. 1. Furthermore, the backpack 101 may include handles, zippers, pockets, sleeves, or other accessories (not shown). In other implementations, the wearable 100 may be headgear (a hat, a helmet, etc.), eyewear (glasses, goggles, etc.), a bag (a purse, a briefcase, a suitcase, a tote, etc.), apparel (shoes, a jacket, an overall, etc.), an accessory (a watch, a necklace, a bracelet, an anklet, etc.), or anything else that the user 102 may wear, carry, or take with him.

Consistent with the present concepts, the wearable 100 may include one or more components. For example, the backpack 101 may include a processor (introduced relative to FIG. 2) for processing computer instructions. The backpack 101 may include storage (introduced relative to FIG. 2) that can store any kind of data, for example, computer-executable instructions and/or user data such as the user's calendar. The backpack 101 may include a battery 106 that can power various components of the backpack 101. The battery 106 may be replaceable and/or rechargeable. For instance, the battery 106 may be charged via a cable to an electrical outlet.

Consistent with the present concepts, the wearable 100 may include one or more input components (e.g., sensors) for receiving inputs from the user 102 and/or for sensing the environment around the user 102. For example, the backpack 101 may include one or more buttons 108 (e.g., switches). The buttons 108 may be used to control any components of the backpack 101. For instance, the buttons 108 may control the battery 106 to power on, power off, sleep, hibernate and/or wake the backpack 101. The buttons 108 may be operated by pressing, long pressing, holding, double clicking, tapping, touching, squeezing, flipping, and/or rotating the buttons 108. The buttons 108 may also be used to pair the backpack 101 with another device (explained below) or to charge another device (explained below). The buttons 108 may be used to activate or provide voice commands to the digital assistant. Voice commands may include a request to perform a certain function and/or a query seeking certain information. The buttons 108 may be located on the strap 104 of the backpack 101 (as illustrated in FIG. 1), on the battery 106, or elsewhere on the backpack 101.

In some implementations of the present concepts, the backpack 101 may include one or more pressure sensors 109 (e.g., force-sensitive resistors). The pressure sensors 109 may be located anywhere on the backpack 101, such as on the straps 104 (as illustrated in FIG. 1), on the handles, at the bottom of the backpack 101, in the pockets, etc. For example, the pressure sensor 109 may be installed inside the strap 104 or at the underside of the strap 104 that contacts a shoulder of the user 102. The pressure sensors 109 may allow the backpack 101 to sense when the backpack 101 is picked up by the user 102, when the user 102 wears on the backpack 101, when the user places the backpack 101 down, and/or when a device is placed in the backpack 101 (or inside a pocket of the backpack 101). Accordingly, the backpack 101 may be configured to automatically turn on when it is worn by the user 102, automatically turn off when taken off by the user 102, and/or automatically pair with a device stowed in a pocket, based on readings from one or more pressure sensors 109.

The backpack 101 may include a camera 110 for visually sensing the environment surrounding the user 102. For example, the camera 110 may be attached to the strap 104 of the backpack 101 and may face the front of the user 102, as illustrated in FIG. 1. In one implementation, the camera 110 may be embedded inside the strap 104, such that the camera 110 is discreetly hidden and/or less noticeable. Alternative camera configurations are possible. For instance, one or more cameras 110 may be positioned to face the rear, sides, down, and/or up above the user 102. For example, cameras 110 may be positioned on each of the straps 104 to capture the environment in a direction the user's body is facing. Another camera 110, such as a fish eye camera may be positioned on the straps 104 to capture the user's face (e.g., where the user 102 is looking). Thus, the cameras 110 can collectively provide data about the orientation of user's body and the user's head.

The camera 110 may be fixed relative to the strap 104 such that the direction in which the camera 110 points changes as the strap 104 moves. In alternative implementations, the camera 110 may be a gimbal camera that can be freely rotated about one or more axes. For example, the direction in which the camera 110 points may remain parallel to the ground (or perpendicular to the direction of gravity) even as the strap 104 moves. Accordingly, the camera 110 may have the same or similar viewpoint as the user 102 and be able to perceive the same or similar environment as the user 102 is perceiving. In other implementations, the camera 110 may be motorized to rotate, tilt, and/or pan the direction in which the camera 110 points. For instance, the backpack 101 may include one or more infrared sensors attached to the straps 104 and pointing upward, such that the infrared sensors can determine the direction the user's head is facing. Accordingly, the camera 110 may be configured to turn in response to the user's head turning, such that the camera 110 can perceive the same part of the surrounding that the user is current looking at.

The camera 110 may capture an image recording of the environment and/or capture a video recording of the environment. The camera 110 may record in black and white, capture visible light using an RBG color model, or capture non-visible light spectrum such as infrared, ultraviolet, x-ray, etc. The camera 110 may be equipped with night vision capabilities. The recordings made by the camera 110 may be stored in the storage of the backpack 101. The recordings may be transmitted to a device (e.g., a server) for storage and/or processing.

The camera 110 may be activated and/or deactivated manually by the user 102 using the button 108, by the user 102 using voice commands, by the digital assistant without explicit input from the user 102, and/or by any other trigger such as scheduled triggers, event triggers, or environmental triggers detected by one or more input components. Alternatively, the camera 110 may be configured (e.g., with the user's consent and/or based on the user's preferences) to be constantly on and recording the user's environment.

Consistent with the present concepts, the backpack 101 may include a microphone 112 for auditorily sensing the environment near the user 102. The microphone 112 may be attached to the strap 104 near the user's mouth to detect the user's speech, as illustrated in FIG. 1. Alternatively or additionally, one or more microphones 112 (e.g., stereo microphones) may be attached to other portions of the backpack 101. In addition to detecting the user's speech, the microphone 112 may also detect other sounds in the user's environment, such as other people's speech, animal sounds, music, traffic sounds, etc. The microphone 112 may generate an audio recording and may store the audio recording in the storage of the backpack 101. The audio recording may be transmitted to a device (e.g., a server) for storage and/or processing. The microphone 112 may operate in connection with the camera 110 to create a video recording of the environment that includes image frames and corresponding audio.

The backpack 101 may include any other input components for sensing the environment of the user 102. For example, the backpack 101 include a global positioning system (GPS) unit for sensing the geographical location, including elevation, of the user 102. In one implementation, the backpack 101 may automatically turn on when it leaves the user's home according to the location information provided by the GPS unit. The backpack 101 may include a compass for sensing the cardinal direction that the backpack 101 (and hence, the user 102) is facing and/or moving towards. The backpack 101 may include an accelerometer for sensing the acceleration, movement, and/or orientation of the backpack 101 (and the user 102). In one implementation, the backpack 101 may automatically sleep or turn off when the accelerometer senses that the user 102 has taken off the backpack 101 and has placed it on the floor, for instance. The backpack 101 may include a thermometer for sensing the ambient temperature of the user's surroundings and/or for sensing the body temperature of the user 102. The backpack 101 may include a barometer for sensing the ambient pressure and/or elevation of the user 102. The backpack 101 may include one or more biometric sensors for sensing the user's heart rate, blood pressure, body temperature, blood sugar level, etc. The backpack 101 may include a radio frequency identification (RFID) sensor for detecting RFID-tagged objects. In one implementation, the backpack 101 may be aware of the contents in the backpack 101 that are RFID-tagged. The backpack 101 may be equipped with any number and any type of sensors, such that the backpack can perceive the user 102 and his environment, and understand contextual commands from the user 102.

The user's privacy can be protected in many ways. For example, the sensors may be enabled to sense the user's environment only if the user 102 provides express consent. Furthermore, recordings of the user's environment may be created only temporarily (i.e., stored just long enough to perform the command provided by the user 102 and the deleted) rather than stored persistently. Additional privacy and security procedures can be implemented to safeguard the user's privacy. For instance, the backpack 101 may encrypt any user-specific data and/or include a security lock (e.g., password, fingerprint, voice recognition, etc.).

Consistent with the present concepts, the wearable 100 may include one or more output components for providing outputs to the user 102, such as responses and/or feedback based on the user's inputs. For example, the backpack 101 may include a speaker 114. The speaker 114 may produce auditory outputs to the user 102, such as the digital assistant's voice, beeps, rings, acoustic tones and alerts, music, error messages, etc. The speaker 114 may be located on the strap 104 of the backpack 101 to be proximate to the user's ears, as illustrated in FIG. 1, or the speaker 114 may be located elsewhere on the backpack 101. The backpack 101 may include multiple speakers 114, for example, to provide stereo sounds to the user 102, to provide ambient sounds into the environment, and/or to direct auditory outputs to another person in front of the user 102. Alternatively or additionally, the backpack 101 may include an audio jack for plugging in a speaker, a headset, or earphones. The plug-in speaker may be powered by its own battery or be powered by the battery 106 of the backpack. Alternatively or additionally, the backpack 101 may be capable of wirelessly connecting to a wireless speaker, such as a wireless headset, wireless earphones, and/or wireless earbuds. The wireless speaker may connect to the backpack 101 via one or more wireless communication protocols, such as Bluetooth, Wi-Fi, or infrared.

The backpack 101 may include a display for providing visual outputs to the user 102. For example, the backpack 101 may include a light emitting diode (LED) display 116 that acts as an indicator light. The LED display 116 may be attached to the strap 104, as illustrated in FIG. 1. The LED display 116 may illuminate different colors, different brightness intensities, different number of LED bulbs in an array, and/or display text and/or images. In various example implementations, the LED display 116 may indicate to the user 102 that the backpack 101 is on, the battery 106 is charging, the battery 106 is low, the battery 106 has a certain percentage of charge remaining, the digital assistant is listening, the digital assistant is talking, the camera 110 is active, the microphone 112 is active, the backpack 101 is paired with another device, an error has occurred, or any other status relating to the backpack 101. For instance, LED display 116, when activated, may signal to other people that the user 102 is talking to the digital assistant. Other types of displays, such as TVs, monitors, display screens, touchscreens, flexible displays, such as organic light emitting diodes (OLEDs), halogen lights, and/or fluorescent lights, may be included in the backpack 101 for displaying lights, text, and/or images to the user 102, and/or for providing visual feedback to the user 102. For example, a display screen may act as a dashboard that shows the user 102 various information about the status of the backpack 101. The display screen may also show the user 102 what the camera 110 is seeing. Moreover, the LED display 116 may be turned on at high intensity to act as a flashlight when the user 102 is in a dark environment. The LED display 116 may activate in connection with the camera 110 to act a camera flash to illuminate the environment that the camera 110 is recording. The backpack 101 may also include an infrared light emitter to enable to the camera 110 to record in the dark using night vision technology.

The backpack 101 may include a haptic component 118 (e.g., a haptic actuator) for providing haptic (e.g., tactile and/or vibrational) outputs to the user 102. In one implementation, the haptic component 118 may be located on one or more straps 104 of the backpack 101 to provide haptic sensations to the user's shoulder(s). Additionally or alternatively, the backpack 101 may include haptic components 118 near the front of the backpack 101 that rests against the user's back, near the bottom of the backpack 101 that rests against the user's waist, or any other location on the backpack 101. The haptic component 118 may be used to provide any type of response, feedback, indication, and/or direction to the user 102. For example, the haptic components 118 can produce various haptic sensations (e.g., short tap, long vibration, various pulses, etc.) to signal to the user 102 that the backpack 101 has turned on, the battery 106 is low, the digital assistant is listening, an error has occurred, the backpack 101 has paired with another device, the camera 110 has been activated, or the user 102 should turn left or right depending on whether the haptic sensation is produced on the left side or right side of the user's body (i.e., shoulders, back, and/or waist). Haptic feedback generated by the haptic component 118 may be more helpful than auditory feedback generated by the speaker 114 where the user 102 is in an environment with a lot of background noise such that auditory feedback may be difficult to hear, or in a very quiet environment where discreet non-auditory feedback is desirable.

The present concepts may utilize an artificial intelligence engine (introduced below relative to FIG. 2), for example, to interpret voice commands from the user 102, sense the environment surrounding the user 102, perform tasks in response to the voice commands, and/or generate outputs to the user 102. In one implementation, the artificial intelligence engine may include one or more modules (explained below) for performing a certain related set of computerized tasks. These modules may be implemented using software and/or hardware. The modules in the artificial intelligence engine may use neural networks and/or other machine learning techniques. Consistent with the present concepts, the artificial intelligence engine can augment the backpack 101 into a smart ambient device that is aware of the environment (e.g., can know where the user 102 is, can see what the user 102 sees, and can hear what the user 102 hears), enabling the backpack 101 to perform contextual tasks based on the environmental context associated with voice commands.

Consistent with the present concepts, the wearable 100 may be capable of connecting with a companion device 120 for exchanging data and/or sharing resources. The companion device 120 may be any electronic device, such as a personal computer, a laptop, a tablet, a smartphone, a personal digital assistant (PDA), a camera, a virtual reality headset, an Internet of things (IoT) device, a vehicle (e.g., a car, a motorcycle, a bicycle, a scooter, etc.), an appliance, a television, a wearable such as a watch or glasses, etc.

The companion device 120 may contain data, such as the user's account information, the user's calendar, the user's address book, the user's task list, the user's shopping list, encyclopedias, databases of songs, databases of images, databases of maps, databases of business directories, current and historical weather data, etc. The companion device 120 may contain resources, such as a processor, a storage, a network interface, applications, a battery, a button, a camera, a microphone, a GPS, a compass, an accelerometer, a thermometer, a barometer, a biometric sensor, a speaker, a display, a haptic actuator, etc. The companion device 120 may include computer programs (e.g., the artificial intelligence engine or the modules thereof). These and other aspects are described in more detail below relative to FIG. 2.

Figure 2:
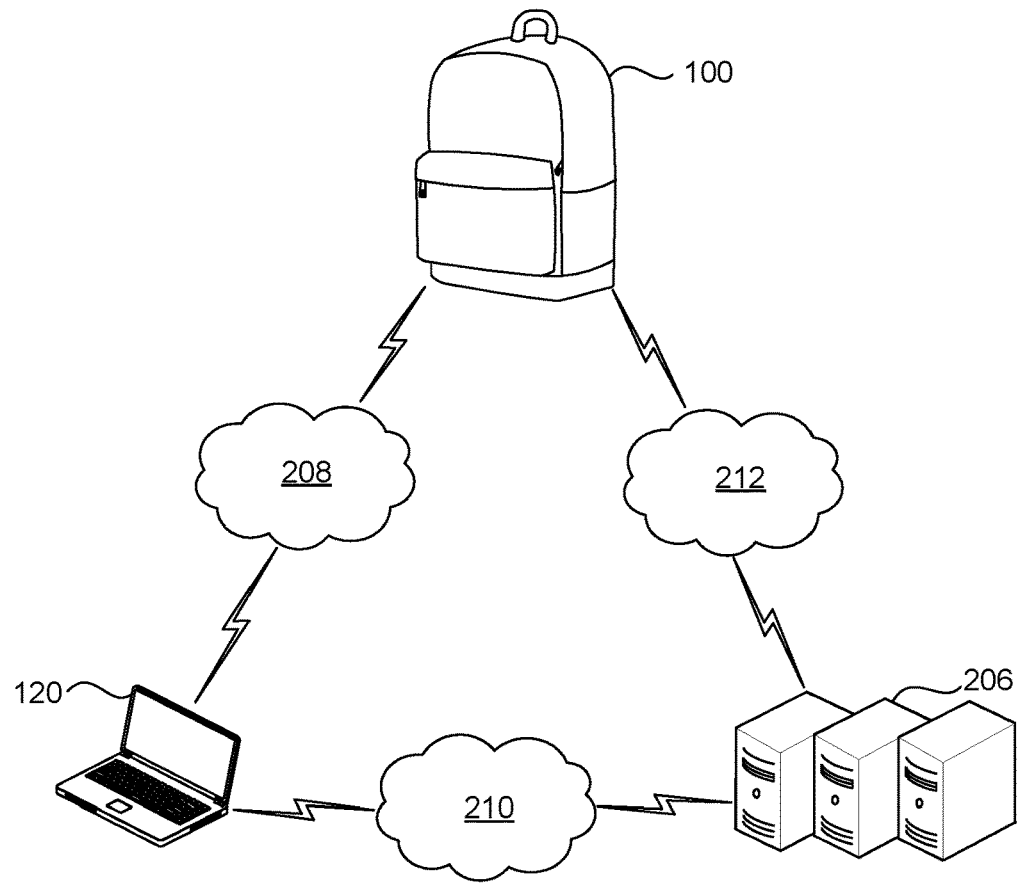
FIG. 2 illustrates example system configurations, consistent with the present concepts.
Figure 2:
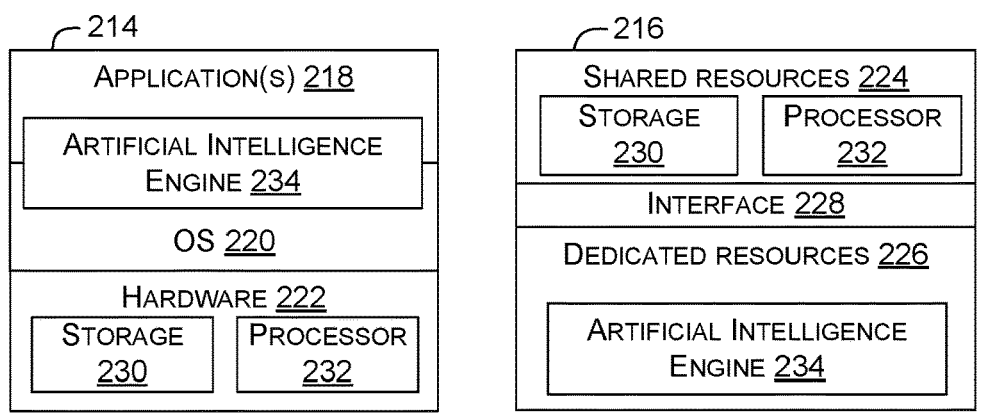

FIG. 2 illustrates example system configurations of an artificial intelligence assisted wearable system 200, consistent with the present concepts. For purposes of explanation, the artificial intelligence assisted wearable system 200 shown in FIG. 2 may include the wearable 100 (e.g., the backpack 101), the companion device 120 (e.g., a laptop), and/or one or more servers 206. The companion device 120 and/or the server 206 may be any type of electronic device capable of performing their respective functions described above, consistent with the present concepts. The companion device 120 and the server 206 may even be included in the same device. The server 206 may include a server computer, a personal computer, a laptop, a video game console, a tablet, a smartphone, or any computer device having storage resources and processing resources. The number of devices and the client-versus-server type of the devices described and depicted are intended to be illustrative and non-limiting.

The wearable 100, the companion device 120, and/or the server 206 may be connected (via wire or wirelessly) to one or more of a first network 208, a second network 210, and/or a third network 212 (directly or indirectly) to communicate with one another and/or access the Internet. Although the first network 208, the second network 210, and the third network 212 have been illustrated as separate networks in FIG. 2, any combination of the three networks may be one and the same.

FIG. 2 also shows a first configuration 214 and a second configuration 216 that can be employed by any or all of the wearable 100, the companion device 120, and/or the servers 206. The first configuration 214 and the second configuration 216 will be explained in reference to the server 206. The first configuration 214 may represent an operating system (OS) centric configuration. The second configuration 216 may represent a system on a chip (SoC) configuration. The first configuration 214 can be organized into one or more applications 218, an operating system 220, and hardware 222. The second configuration 216 may be organized into shared resources 224, dedicated resources 226, and an interface 228 therebetween. In either the first configuration 214 or the second configuration 216, the server 206 can include a storage 230 and a processor 232. The server 206 can also include an artificial intelligence engine 234.

In the second configuration 216, the functionality provided by the server 206 can be integrated on a single SoC or multiple coupled SoCs. The processor 232 can be configured to coordinate with the shared resources 224, such as the storage 230, etc., and/or the dedicated resources 226, such as the artificial intelligence engine 234 configured to perform certain specific functionality. Thus, the term "processor" as used herein can also refer to central processing units (CPUs), graphical processing units (GPUs), controllers, microcontrollers, processor cores, or other types of processing devices.

The term "device," "computer," or "computing device" as used herein can mean any type of device that has some amount of processing capability and/or storage capability. Processing capability can be provided by one or more hardware processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, optical storage devices (e.g., CDs, DVDs etc.), and/or remote storage (e.g., cloud-based storage), among others. As used herein, the term "computer-readable media" can include transitory propagating signals. In contrast, the term "computer-readable storage media" excludes transitory propagating signals. Computer-readable storage media may include computer-readable storage devices. Examples of computer-readable storage devices may include volatile storage media, such as random-access memory (RAM), and non-volatile storage media, such as hard drives, optical discs, and flash memory, among others.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

As mentioned above, the artificial intelligence engine 234 may include one or more modules for performing a certain related set of computerized tasks. For example, the artificial intelligence engine 234 may include a voice recognition module. When the user 102 talks into the microphone 112, the voice recognition module may receive a recording of the user's speech and use artificial intelligence to recognize the voice of the user 102, as distinguished from the voices of other people, for identification and/or authentication purposes. For instance, the backpack 101 may include a security feature that allows it to be used only by the user 102 or only by a certain set of authorized users. The backpack 101 may be trained to recognize the voice of the user 102, for example, when the user 102 first uses or registers to use the backpack 101. Moreover, the backpack 101 may behave differently (e.g., through preference settings and/or based on past historical use of the backpack 101 by different users) depending on which user is using the backpack 101.

The artificial intelligence engine 234 may include a speech recognition module for interpreting the voice commands provided by the user 102. For example, the speech recognition module may convert the audio recording of the voice command from the user 102 into text using artificial intelligence. The speech recognition module may be generically trained using speech from a large population and/or specifically trained using speech from the user 102.

The artificial intelligence engine 234 may include an audio recognition module for recognizing and identifying various types of sounds. For example, the audio recognition module may be trained to recognize musical songs; musical instruments; sounds of animals and insects; sounds of vehicles; sounds of machines and tools; or any other sounds that could exist in the environment.

The artificial intelligence engine 234 may include a computer vision module. The computer vision module may be capable of receiving image recordings and/or video recordings of the environment surrounding the user 102 (for example, captured by the camera 110) and recognizing the contents of the recordings. For example, the computer vision module may include an image recognition module, a text recognition module, and/or a facial recognition module. The image recognition module may be trained to recognize and identify various objects or entities in the environment around the user 102, such as people, animals, plants, insects, inanimate objects like cars, rocks, buildings, etc. The text recognition module may be trained to recognize and interpret text and other symbols. The facial recognition module may be trained to recognize and identify people's faces and animal faces.

The artificial intelligence engine 234 may include a cognitive module for interpreting and understanding the semantics, logic, reason, and/or purpose of the voice commands provided by the user 102. The cognitive module may use a combination of rules and machine learning to decipher voice commands, for example, to determine one or more tasks to be performed in response to the voice commands.

Consistent with the present concepts, the user 102 may provide a contextual voice command that includes a contextual signal relating to any contextual information (e.g., an object) in the environment surrounding the user 102. For example, a contextual signal may be any non-explicit reference (e.g., a contextual reference or a contextual cue), including pronouns (e.g., "this," "that," "it," "him," "her," "what," "who," "these," "both," etc.), as well as other indirect references (e.g., "here," "one," "some," etc.). The cognitive module may recognize that the voice command is contextual and may determine the proper context using one or more input components to sense the environment and then interpreting the environment using one or more of the modules (e.g., the computer vision module) in the artificial intelligence engine 234. These techniques will be described in more detail below with reference to later figures.

The artificial intelligence engine 234 may include a digital assistant module for performing computerized tasks (e.g., consisting of computerized actions) for the benefit of the user 102. For example, the digital assistant module may perform a task that the cognitive module determined should be performed in response to a voice command from the user 102. The digital assistant module may have access to information, such as a digital calendar of the user 102, a digital address book of the user 102, a digital shopping list of the user 102, a digital task list of the user 102, the Internet, encyclopedias, search engines, databases of songs, databases of images, databases of maps, databases of business directories, current and historical weather data, etc. The digital assistant module may perform any computerized task so long as it has access to read and/or write the required data for the task. Example of tasks that the digital assistant module can perform may include adding events to the user's calendar, removing a merchandise item from the user's shopping list, reminding the user 102 about an incomplete task in his task list, answering a question from the user 102 by accessing one or more data sources, sending a text message, reading an email, etc.

The digital assistant module may generate outputs to the user 102. The outputs may be a vocal answer to a question from the user 102, an acknowledgment of a command from the user 102, a feedback that a task was performed, a request for information from the user 102, etc. The output may be an auditory output produced by the speaker 114, a visual output produced by the LED display 116, and/or a haptic output produced by the haptic component 118. Other types of outputs are possible.

In one implementation of the present concepts, the wearable 100 may be a standalone device. For example, the backpack 101 may include the input components, the output components, and the artificial intelligence engine 234 (or have access to the same). That is, the storage in the backpack 101 may include computer programs to operate the input components and the output components as well as computer programs that implement or access the artificial intelligence engine 234. The backpack 101, as a standalone device or operating in a standalone mode, may sense and interpret the environment surrounding the user 102, interpret voice commands from the user 102, execute tasks in response to the voice commands, and output responses to the user 102.

In one implementation, the wearable 100 may include a network interface to connect to one or more networks (e.g., the first network 208, the second network 210, and/or the third network 212) and to communication with other devices (e.g., the companion device 120, the server 206, or any other device). For example, the backpack 101 may include a wired network interface (e.g., an Ethernet interface) and/or a wireless network interface (e.g., a cellular network interface, a Wi-Fi network interface, a Bluetooth network interface, and/or a near field communication (NFC) interface). The cellular network interface may use a subscriber identity module (SIM) card and enable the backpack 101 to access the Internet through a cellular data network when the user 102 is anywhere within a cellular network coverage area.

In one implementation, the backpack 101 may use the network interface to access data (including computer programs) that is stored remotely. For example, the user's calendar, address book, task list, and/or shopping list may be stored in a remote server (e.g., a cloud storage), such as the server 206, that is accessible by the backpack 101 via the Internet. The backpack 101 may also access other remote data sources (e.g., encyclopedias, search services, databases, etc.) using the network interface. In some implementations, the artificial intelligence engine 234 (or certain modules thereof) may be located in a remote server, such as the server 206, that is accessible by the backpack 101 via the network interface. These implementations may be more feasible and appropriate where the artificial intelligence engine 234 (or certain module thereof) requires more processing power, storage, and/or other resources than can fit in the wearable 100.

In some implementations consistent with the present concepts, the wearable 100 may operate in an offline mode. For example, the backpack 101 may operate in offline mode without using any of its network interfaces and thus without connecting to a network or communicating with other devices. The backpack 101 in the offline mode may have limited capabilities that do not require communicating with any other devices (including the servers 206). For example, where the speech recognition module is housed in the backpack 101 but the computer vision module is hosted by the server 206, the backpack 101 operating in the offline mode may be able to interpret voice commands from the user 102 and execute certain tasks that do not require any computer vision capabilities while unable to execute other tasks that require the computer vision module.

The backpack 101 may connect (via wire or wirelessly) with the companion device 120 to exchange data and/or share resources. For example, the backpack 101 may physically connect to the companion device 120 via a cable. The backpack 101 may wirelessly connect to the companion device 120 using a wireless protocol, such as the Wi-Fi protocol or the Bluetooth protocol. The backpack 101 may include a pocket, a pouch, a compartment, a sleeve, a strap, a docking station, a Velcro attachment, a magnetic attachment, a clip, a slot, or any other type of holder for the companion device 120. The battery 106 in the backpack 101 may power and/or charge the companion device 120. For example, the backpack 101 may charge the user's smartphone. Additionally or alternatively, the companion device 120 may power the backpack 101 and/or charge the battery 106. For example, the user's laptop may charge the battery 106. The exchange of power between the backpack 101 and the companion device 120 may be via a cable (e.g., a universal serial bus (USB) cable) or via wireless charging.

Consistent with the present concepts, the wearable 100 may utilize resources available on the companion device 120 and/or the servers 206 to provide digital assistance experience for the user. For example, in one implementation, the backpack 101 may connect to the Internet using the companion device's cellular network connection in order to use the artificial intelligence engine 234 available on the server 206. In another implementation, backpack 101 may use a GPS unit of the companion device 120 to determine the location of the user 102 rather than having its own built-in GPS. In another implementation, the backpack 101 may use a speaker on the companion device 120 to output auditory feedback to the user 102 instead of having or using its own built-in speaker 114. In another implementation, the backpack 101 may use an audio recognition module available on the companion device 120 to identify songs. In another implementation, the backpack 101 may use the processing resources and/or the storage resources of the companion device 120 to generate video recordings of the environment. In another implementation, the backpack 101 may use a display screen of the companion device 120 to show the user 102 what the camera 110 is seeing. In other implementations, the user's calendar may be stored in the companion device 120 or stored in the server 206. It should be apparent that numerous permutations of configurations are possible, where any of the input components, any of the output components, any of the modules of the artificial intelligence engine 234, any of the processing resources, any of the storage resources, any of the power resources, and/or any of the data sources can be located in the backpack 101, in the companion device 120, and/or in the servers 206.

In one implementation, the backpack 101 may identify and/or authenticate the user 102 based on the companion device 120 that is connected to the backpack 101. For instance, the companion device 120 may include a device identification or a user identification that is associated with the user 102 and is communicated to the backpack 101. Accordingly, if a different user with her own companion device wears the backpack 101, the backpack 101 can determine that a different user is now wearing the backpack 101 based on the identification of the different companion device.

Figure 3A:
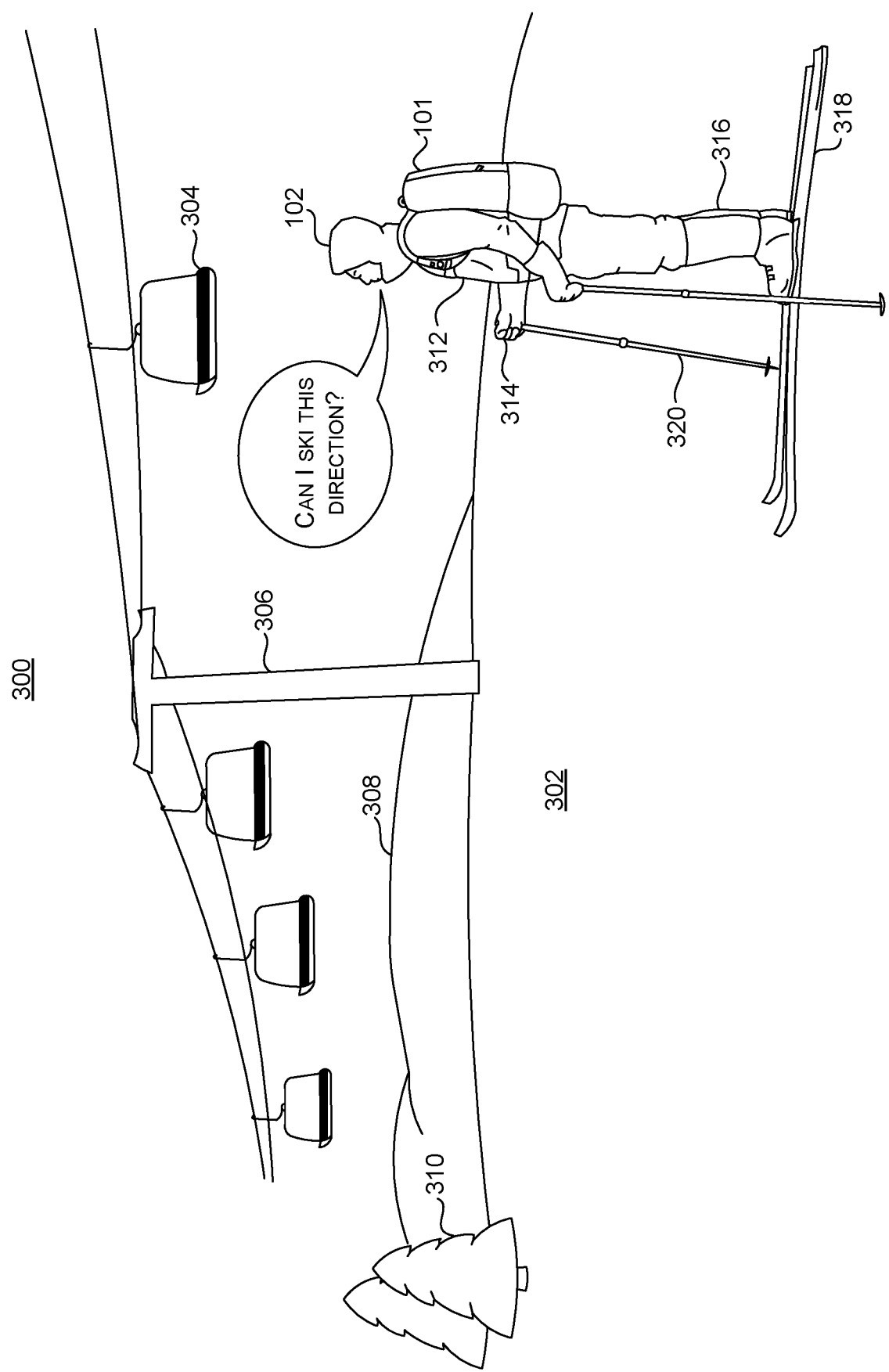
FIGS. 3A, 3B, and 4 illustrate example scenarios, consistent with the present concepts.
Figure 3B:
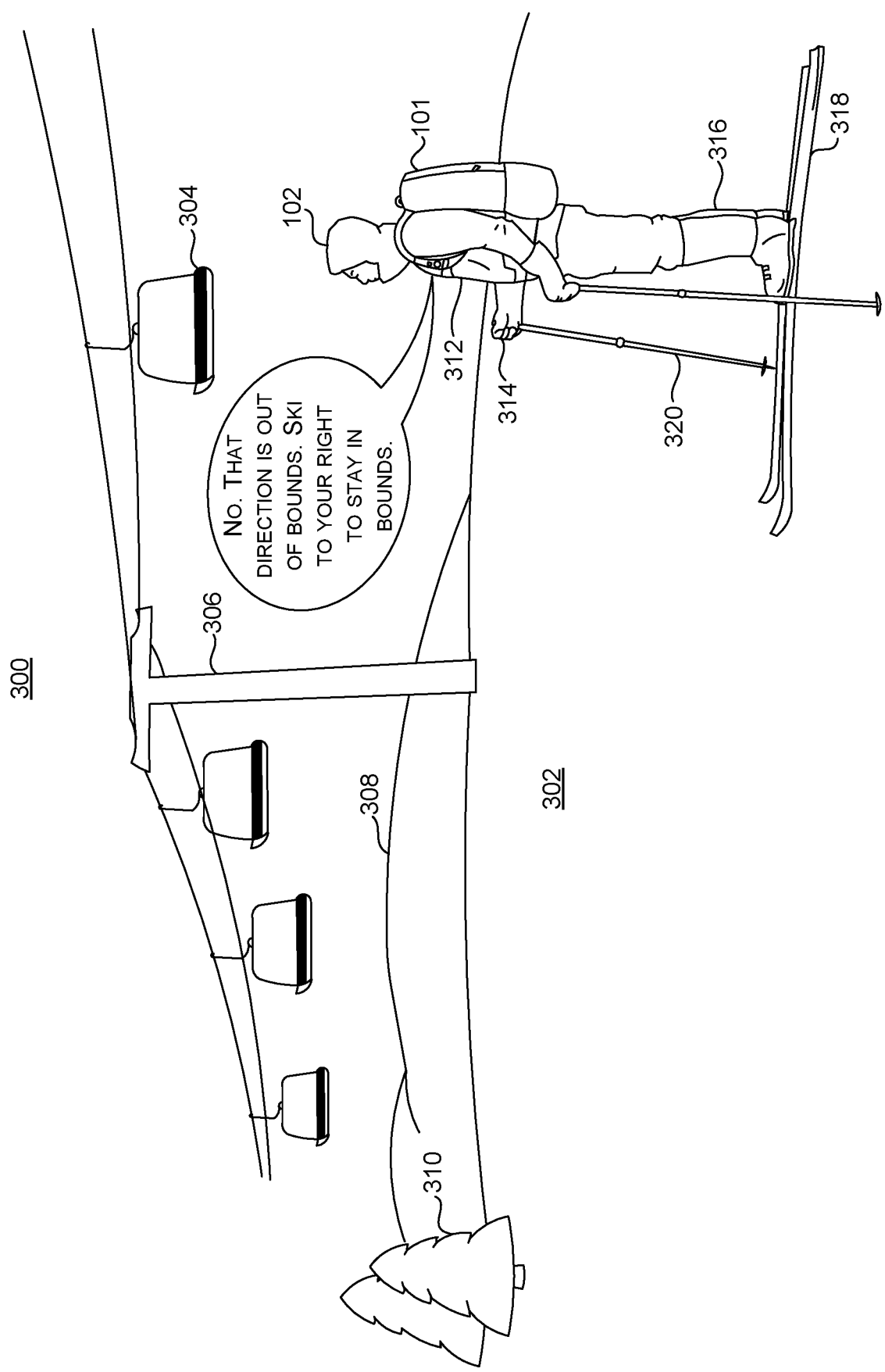

FIGS. 3A and 3B illustrate an example scenario, consistent with the present concepts. Several example scenarios will be explained to illustrate the functionalities, operations, versatility, and benefits of the present concepts. In FIG. 3A, the user 102 may be carrying the backpack 101. The user 102 may be in an environment 300 of a ski resort. That is, the environment 300 may include ski slopes 302, ski lifts 304, ski lift poles 306, mountains 308, trees 310, etc. The user 102 may be wearing winter apparel including a jacket 312, gloves 314, boots 316, etc. In this example scenario, the user 102 may be on skis 318 and holding ski poles 320 with his hands.

Suppose that the user 102 in this example scenario is unsure which way to ski in order to stay in bounds. Conventionally, the user 102 may need to stop skiing, release the ski poles 320 from his hands, take off the gloves 314 from his hands in the frigid weather, reach into his pocket or backpack to pull out his smartphone using his shaking bare hands, and manually use a map app or a conventional digital assistant to determine which way he should go to stay in bounds. Such conventional actions require the user 102 to stop his current activity (i.e., skiing), take his eyes off his surroundings, and focus his eyes and attention at a smartphone display screen. Even using a conventional digital assistant with voice command capabilities, the user 102 would need to explicitly convey information about the environment 300, such as his location, the name of the ski resort, and/or the cardinal direction (i.e., north, south, east, and west) he is currently facing. These conventional actions may be difficult for the user 102 in the environment 300 to perform.

On the contrary, consistent with the present concepts, the user 102 may conveniently ask the backpack 101, "Can I ski this direction?" In this example, the microphone 112 on the backpack 101 may record the user's voice command and send the audio recording to the speech recognition module. The speech recognition module may then interpret the audio recording of the voice command into text. The cognitive module may interpret the text transcript of the voice command and recognize that the pronoun "this" is a contextual signal, and therefore, the voice command provided by the user 102 is a contextual voice command that references the environment 300 surrounding the user 102. Accordingly, backpack 101 may attempt to perceive the environment 300 in one or more ways. For example, the camera 110 on the backpack 101 may be activated to record the environment 300. Where the camera 110 faces the front of the backpack 101, the camera 110 may be pointing in the same direction that the user 102 is facing. In this example scenario, the camera 110 may capture an image recording of the environment 300 including, for example, the ski slopes 302, the ski lifts, 304, the ski lift poles 306, the mountains 308, the trees 310, etc. The backpack 101 may use the compass to determine the cardinal direction that the user 102 is facing.

The backpack 101 may use GPS to determine the geographical location of the user 102. By sensing the environment 300 in one or multiple ways, the backpack 101 may interpret and understand that the pronoun "this" in the voice command provided by the user 102 is referring to a specific cardinal direction (e.g., west) from a specific geographical location where the user 102 is standing. Accordingly, the backpack 101 may determine that the user 102 is at a specific ski resort, may obtain the slopes map for that specific ski resort by accessing a ski resort map database, determine which direction the user 102 should ski to stay in bounds, and answer the user's question by formulating an appropriate response. For example, as shown in FIG. 3B, the backpack 101 may use the speaker 114 to produce an auditory response "No. That direction is out of bounds. Ski to your right to stay in bounds."

Therefore, consistent with the present concepts, the user 102 is able to interact with the backpack 101 to obtain information about the environment 300 by simply speaking a contextual voice command. The user 102 need not stop skiing, need not let go of the ski poles 320, need not take off the gloves 314, need not take his eyes off the slopes (including the trees 310 that he needs to avoid), and need not take his attention away from his current activity. Furthermore, the backpack 101 is context-aware (i.e., can sense and perceive the environment 300) and thus is capable of understanding contextual commands that refer to the environment 300. Thus, the user 102 and the backpack 101 are able to speak to each other naturally using contextual language, such as "this direction" and "that direction," because both the user 102 and the backpack 101 can perceive the same environment together.

Figure 4:
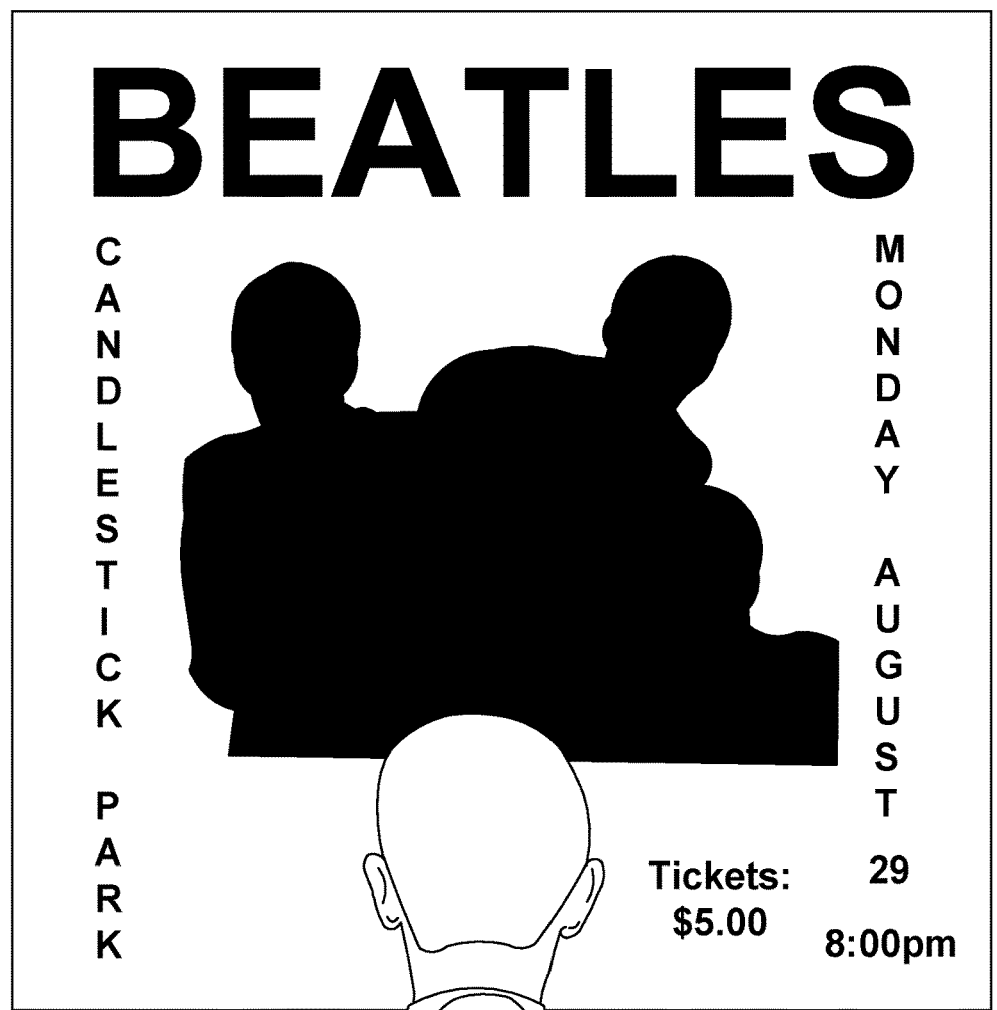

FIG. 4 illustrates another example scenario, consistent with the present concepts. In FIG. 4, the user 102 may be carrying the backpack 101 and standing in front of a poster 400. The poster 400 may be advertising a Beatles concert at the Candlestick Park on Monday, August 29 at 8:00 pm, which costs $5.00 per ticket. The user 102 may wish to add an appointment in his calendar for this event, because he plans to attend the concert.

Conventionally, a user may typically have to free his hands (e.g., take off his gloves), reach into his pocket or backpack to pull out his smartphone, launch a calendar application, create a new appointment, manually type in the details of the event (e.g., the title of the event, the venue, date and time, and any notes he may wish to add, such as the entry fee), and save the new appointment for the event. Such conventional practices may be so tedious, cumbersome, and time-consuming that users may be deterred from using the calendar and just forego creating the appointment altogether. Even if a busy user in a hurry can pull out his smartphone and take a photo of the poster 400 so that he can create an appointment in his calendar later by referring back to the photo, the user would still have to manually enter the details of the appointment. Moreover, even if the user's smartphone is equipped with a conventional voice-activated digital assistant, the user would have to formulate an overly explicit command and provide complete details relating to the command without error. For example, the user would have to say, "Hey Assistant, create a calendar appointment titled Beatles concert on August 29 at 8 pm at the Candlestick Park and add a note that the ticket costs $5." If the user makes any misstatement or pauses too long in the middle of this long-winded voice command, then the user would have to cancel, erase, and start over.

However, consistent with the present concepts, the user 102 can simply tell the backpack 101, "Hey Assistant, add this to my calendar," and the backpack 101 will add an appointment to the user's calendar for the event shown in the poster 400. For example, the microphone 112 on the backpack 101 may record the user's voice command and send the audio recording to the speech recognition module. The speech recognition module may then interpret the audio recording of the voice command into text. The cognitive module may interpret the text transcript of the voice command and recognize that the pronoun "this" is a contextual signal, and therefore, the voice command provided by the user 102 is a contextual voice command that references the environment surrounding the user 102. Accordingly, the camera 110 on the backpack 101 may be activated to record the environment. Where the camera 110 faces the front of the backpack 101, the camera 110 may be pointing at the same object in the environment that the user 102 is looking at. In this example scenario, the camera 110 may capture an image recording of the poster 400 and send it to the computer vision module. Then, the text recognition module may recognize the textual contents of the poster 400 (i.e., the name of the band, venue, date, time, and ticket price). Furthermore, the cognitive module may interpret the voice command and understand that the user 102 wishes to create a calendar event based on the contents of the poster 400. In response, the cognitive module may determine that a contextual task of adding an event to the user's calendar based on the poster 400 should be performed in response to the contextual voice command provided by the user 102. Accordingly, the digital assistant module may access the user's calendar and create a corresponding event in the user's calendar. Consistent with the present concepts, the user 102 can conveniently and quickly provide contextual voice commands to the backpack 101 without needing to divert his focus and attention away from the environment to a smartphone or another digital assistant device. Furthermore, the user 102 can provide a short natural voice command that references the environment in a normal way, as though he were talking to another person standing next to him, not like talking to a conventional digital assistant. Importantly, the backpack 101 can understand the contextual voice command that uses an indirect reference (i.e., the pronoun "this") and perform the correct contextual task relating to the environment.

Accordingly, the backpack 101 allows the user 102 to quickly, conveniently, and naturally provide contextual commands (including queries) to the backpack 101 that requires the backpack 101 to perceive, sense, and/or understand the context of the user's command in reference to the environment, surroundings, or an object near the user 102. Whereas conventional digital assistants may be incapable of understanding, processing, or handling contextual commands, the wearable 100 consistent with the present concepts can use one or more sensors and artificial intelligence to perceive the environment and decipher contextual commands.

Many variations in configurations, implementations, and/or uses are possible with the present concepts. For example, the user 102 standing in front of the poster 400 may press the button 108 before speaking the voice command. Alternatively, the backpack 101 may always be in listening mode. The backpack 101 may be configured to recognize that the voice command feature is being activated by listening for a keyword or a hotword (i.e., a specific word or phrase, such as "Hey Assistant," "Hi Backpack," "computer," or any other name, greeting, and/or phrase). Furthermore, the camera 110 may always be active or be configured to automatically activate whenever the user 102 provides a voice command. The recording of the environment may be captured before, during, or after the user 102 provides the contextual voice command. Depending on the complexity of the environmental context and/or the sophistication of the artificial intelligence engine 234, the user may adjust the level of detail in the contextual voice command. For example, the user 102 may specify, "Hey Backpack, add this poster to my calendar." Or if there are two posters aligned vertically, the user 102 may specify, "Hey Assistant, add the bottom poster to my calendar." Or if the user 102 is standing in front of a wall full of multiple posters, the user 102 may specify, "Hey Assistant, add the Beatles concert to my calendar." Furthermore, as mentioned above, the speech recognition module, the cognitive module, the text recognition module, and/or the digital assistant module may be located in the backpack 101, the companion device 120, and/or the server 206.

Many other contextual voice commands may be provided by the user 102 to cause corresponding contextual tasks to be performed by the backpack 101. For example, the user 102 in FIG. 2 may tell the backpack 101, "Hey Assistant, add a task to buy a ticket for this event." The cognitive module may interpret the contextual signal "this event" in the context voice command to refer to the Beatles concert by using the camera 110 and the computer vision module to perceive and interpret the poster 400 in the environment of the user 102. Furthermore, the cognitive module may understand that the user wishes to add a new task to his task list based on interpreting the voice command, and cause the digital assistant module to modify the user's task list by adding a new task accordingly. As another example, the user 102 in FIG. 2 may ask the backpack 101, "Who is this band?" In response, the artificial intelligence engine 234 may use the camera 110 to capture an image recording of the poster 400, the cognitive module may understand that the user is asking information about the band named Beatles, and the digital assistant may access one or more data sources to provide information about the Beatles to the user 102 by outputting an answer through the speaker 114: "The Beatles were a British rock music band popular in the 1960's. The band consisted of four men named John Lennon, Paul McCartney, George Harrison, and Ringo Starr . . . ." In this example, the backpack 101 may be able to provide information to the user 102 about the surrounding environment.

The backpack 101 may generate many different types of outputs to the user 102 depending on the voice command provided by the user 102, the task performed by the backpack 101, settings, preferences, scenarios, and/or situations. For example, the speaker 114 may output a shutter sound when the camera 110 is capturing an image of the environment. The LED display 116 may light up when the backpack 101 is listening. The haptic components 118 may vibrate in response to the user 102 saying "Hey Assistant" to let the user 102 know that the backpack 101 is ready to listen to the user's voice command. The speaker 114 may output a sound and/or the haptic component 118 may vibrate as feedback to the user 102 that a contextual task (e.g., adding an event to the calendar or adding a task to the task list) has been performed. The speaker 114 may generate a verbal output, such as, a confirmation that a task has been performed (e.g., "Got it. I added the Beatles concert to your calendar."), an answer to the user's query (e.g., "The weather today is sunny."), or ask the user 102 a question (e.g., "When do you want me to remind you about the Beatles concert starting on Monday, August 29 at 8 pm?").

Additional example scenarios will be provided to demonstrate the versatility in the functionality and usability of the wearable 100, consistent with the present concepts. For instance, the user 102 wearing the backpack 101 may be walking inside a store (e.g., in a mall) and picks up a merchandise item (e.g., an apple in a grocery store, a hammer in a hardware store, a hat in an apparel store, etc.) and speaks, "Hey Backpack, check this off my shopping list." In response, the backpack 101 may use the camera 110 to capture an image of the merchandise item in front of the camera 110 (whether the user 102 is holding the merchandise item in his hand in front of the camera 110 or the merchandise item is sitting on a shelf in front of the camera 110), use the image recognition module to identify the voice command's reference to the merchandise item in the user's environment captured in the image, and use the digital assistant module to delete the merchandise item from the user's shopping list. (The act of identifying the voice command's reference to the merchandise item by the image recognition module will be explained in detail below in connection with FIG. 5.) The backpack 101 may use the speaker 114 to output a response, such as "Sure thing. A hammer has been checked off from your shopping list," "There is no apple in your shopping list," "Are you sure you want to remove the hat from your shopping list?" "I'll delete blue pens from your shopping list the next time I'm connected to the Internet."

The user 102 may also perform a price check on the merchandise item by asking the backpack 101, "Hey Assistant, how much is this?" The backpack 101 may use the GPS unit to determine that the user 102 is inside a particular store (e.g., Nordstrom, Target, Home Depot, Best Buy, etc.), use the digital assistant module to access the prices database of the appropriate store, and provide the user 102 with the requested information through the speaker 114: "That hat is $15.99." The backpack 101 may instruct the user: "Please hold the bar code in front of the camera." The user 102 may also perform a price comparison: "How much is it at JC Penney?" In response, the backpack 101 may check the price of the merchandise item at JC Penney and respond with: "That hat is $14.99 at JC Penney."

As another example, the user 102 may be wearing the backpack 101 and standing in front of a menu posted on a wall in front of a restaurant. The user 102 may ask the backpack 101, "How good is this place?" The backpack 101 may detect the contextual signal "this place" and interpret the context of the voice command as referring to a particular location. The backpack 101 may identify the referenced location as a particular restaurant by using the GPS unit to determine the location of the user 102 and/or using the camera to recognize an image of the restaurant name on the menu or on the restaurant storefront sign. Then, the backpack 101 may access a data source of restaurant ratings and reviews and inform the user 102, "This restaurant has a 4.5-star rating from 2,190 reviews at RateRestaurants.com." Furthermore, the user 102 may ask the backpack 101, "What's popular here?" In response, the backpack 101 may access a database of past orders or past reviews of specific dishes at this particular restaurant from one or more data sources, and answer the user's query with "The most popular entrees at this restaurant are the chicken alfredo and the meat lasagna, and the most popular dessert is the chocolate mousse cake." The user 102 may also ask the backpack 101, "What do you think I will like here?" In response, the backpack 101 may access the user's food preferences and/or cost preferences (or determine the user's food preferences and/or cost preferences based on the user's past orders) and recommend, "I think you will like the shrimp scampi for $12.99."

As another example, the user 102 may be wearing the backpack 101 in a city and say, "walk me home," to the backpack 101. In response, the backpack 101 may utilize the orientation of the user 102 (i.e., which way the user 102 is facing), use GPS, and access a map database and/or a navigation service to direct the user 102 to his home. For example, the backpack 101 may output auditory instructions via the speaker 114, such as "Okay, I'll take you home. Start by going straight," "turn right on Pacific Parkway," "turn left in 100 feet," or "use the crosswalk to cross Atlantic Avenue." Additionally or alternatively, the backpack 101 may activate the haptic components 118 on the left side and on the right side of the backpack 101 to signal to the user 102 that he should turn left or right, respectively. As another example, the user 102 wearing the backpack 101 may step off a bus or walk out of a train station and ask the backpack 101, "Which way to the library?" The backpack 101 can use the compass for the user's orientation, the GPS unit for the user's location, and/or accessible map data to guide and steer the user 102 by outputting through the speaker 114, "Go left and head south" or by outputting haptic vibrations on the left side of the user's body.

In some implementations, the camera 110, the microphone 112, the GPS unit, the compass, and/or the biometric sensor may remain activated and recording to serve a black box for security purposes in case there is an accident. For example, the camera 110 and the microphone 112 can act as a security body cam. The GPS unit, compass, and biometric sensor can record the user's location, direction, and biometric readings.

In addition to giving contextual commands that refer to the user's current location, the user 102 may also give contextual commands that refer to objects in the surroundings. For example, the user 102 in the city may say "guide me over that bridge" or the user 102 hiking in nature may say "direct me over that hill" or "how do I get to the other side of this river." In response, the backpack 101 may use the camera 110 to identify the appropriate contextual reference (e.g., the bridge, the hill, or the river in the image captured by the camera 110) in the user's voice command and perform the appropriate contextual task of navigating the user 102 to where he wants to go.

Furthermore, the present concepts can greatly benefit people with disabilities. For example, the backpack 101 may assist the visually impaired population (e.g., a blind person walking on foot). The backpack 101 may help the blind person navigate busy city streets by generating haptic and/or auditory feedback to instruct the blind person when and where to turn. The backpack 101 can see the environment around the blind person (including vehicles, traffic lights, crosswalk markings, other pedestrians, etc.) in real-time using the camera 110 and can safely guide the blind person. The backpack 101 may also assist the hard-of-hearing population (e.g., a deaf person). The backpack 101 may listen to sounds in the deaf person's environment and provide non-auditory (e.g., visual and/or haptic) feedback to the deaf person. For example, if a car honks at the deaf person while walking in the city, the backpack 101 may provide a strong haptic response to the deaf person's body in the same direction that the honk sound came from.

Furthermore, the user 102 may want to hail a cab ride (e.g., a taxi service or a rideshare service) after the user 102 has finished hiking or when the user 102 is walking in the city. The user 102 may tell the backpack 101, "Hey Backpack, order a car ride home." The backpack 101 may use the digital assistant module to access a car ride service, to order a ride for the user 102, and to respond with, "No problem. A red Toyota Corolla will be here in 7 minutes to pick you up."

As another example, the user 102 wearing the backpack 101 may be hiking in a foreign country, sees a foreign language sign posted next to a lake, and asks the backpack 101, "Hey Assistant, what does this say?" In response, the backpack 101 may detect the contextual reference in the query from the user 102, use the camera 110 to determine the context of the query, access a language translation service, and inform the user 102 through the speaker 114, "That sign says 'toxic waste dump, do not enter the water.'" Moreover, the backpack 101 can act as a personal translator while the user 102 is traveling in a foreign country. For example, the user 102 can tell the backpack 101, "Hey Backpack, tell this ticketing agent that I want to buy one ticket for the train to Paris that leaves in 15 minutes." In response, the backpack 101 can use the speaker 114 to tell the ticketing agent the translated message in the appropriate language based on the location of the user 102 as determined by GPS and/or based on the spoken language detected in the ambient sounds picked up by the microphone 112.

As another example, the user 102 wearing the backpack 101 may be standing in front of a movie poster or a billboard sign and asks, "Who is that?" In response, the backpack 101 may use the camera 110 to determine the context of the user's query by capturing an image of a person in the movie poster or the billboard sign, and interpret the user's query as asking for an identification of the person. The backpack 101 may use the facial recognition module to determine the identity of the person captured in the image and produce an output to the user 102: "That person is Kim Kardashian."

As another example, the user 102 wearing the backpack 101 may walk into a venue (e.g., a restaurant, a bar, a nightclub, an outdoor concert, etc.) and hear a song that the user 102 likes. The user 102 may ask the backpack 101, "Hey Assistant, what song is this?" "Who sings this?" or "Hey Assistant, download this song to my phone." In response, the backpack 101 may use the cognitive module to understand that the voice command from the user 102 is a contextual voice command that refers to a song playing in the environment of the user 102. Accordingly, the backpack 101 may record the song playing in the environment using the microphone 112 after the receipt of the voice command and/or use a recording of the environment including the song that was made before the user 102 provided the voice command. The backpack 101 may access a database of songs to identify the song playing in the user's surroundings, and perform the appropriate contextual task based on the user's contextual voice command. For example, the backpack 101 may audibly inform the user 102 using the speaker 114 the identification of the song (e.g., "That song is Thriller by Michael Jackson.") or download a copy of the song to the user's phone (e.g., "The song has been downloaded to your phone."). The user 102 may provide contextual voice commands that relate to any sound in the environment to the backpack 101, such as animal sounds, instrument sounds, etc.

As another example, the user 102 wearing the backpack 101 may be hiking, biking, skiing, or snowboarding, etc. The user 102 may ask the backpack 101, "How much higher is that hill?" "How tall is that mountain?" "How long is that trail?" or "How steep is that slope?" In response, the backpack 101 may interpret the contextual voice command based on an image of the environment taken by the camera 110, the orientation of the user's body and/or head, the location of the user 102 determined by the GPS unit, and/or a map of the user's surroundings from a maps data source. The backpack 101 may determine the answer to the user's query based on the image of the user's environment (including an image capture of the hill, mountain, trail, or the slope), the location (including the elevation) of the user, a topographic map, and/or a trails map. The backpack 101 may output a response to the user's query using the speaker 114, such as "That hill is 350 feet higher than your elevation," "That mountain is 2,680 feet above sea level," "That trail is 2.8 miles long," or "That slope is 30% gradient." Accordingly, the user 102 can easily obtain information about his environment from the backpack 101 using contextual voice commands.

It should be evident from the example scenarios described above, including the example contextual commands and the example contextual tasks, that the artificial intelligence assisted wearable 100 that is capable of perceiving the environment and understanding contextual commands, consistent with the present concepts, can have a wide range of applications, functionalities, and utility.

Figure 5:
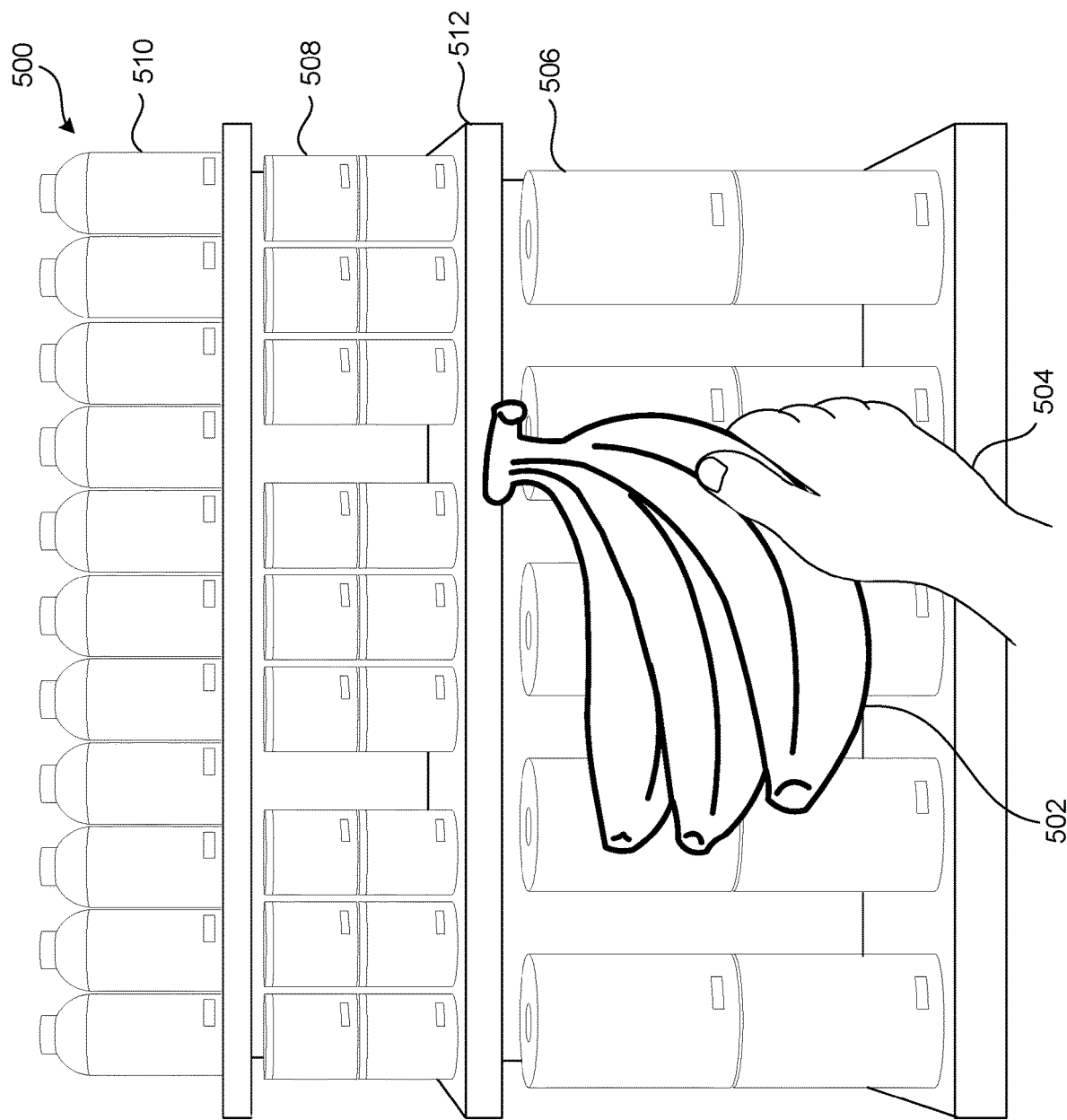
FIG. 5 illustrates an example image of an environment, consistent with the present concepts.

FIG. 5 illustrates an example image 500 of an environment having objects, consistent with the present concepts. Using one or more sensors, the artificial intelligence engine 234 may detect, recognize, and/or identify objects in the environment surrounding the user 102. For example, the image 500 shown in FIG. 5 may include the environment captured by the camera 110 as the user 102 wearing the backpack 101 is standing in a grocery store aisle and holding up bananas 502 on his hand 504. The user 102 may provide a contextual voice command to the backpack 101, such as "Remove this from my shopping list," "How much is this?" "Is this on sale?" "What did this cost last week?" "Do I need this?" or "How much is this at the next closest grocery store?" In response, the artificial intelligence engine 234 may recognize that the contextual voice command includes a contextual signal and therefore may determine the proper context of the user's voice command.

In this example, the image 500 may be processed by the computer vision module (for example, the image recognition module) to determine the context of the voice command. For instance, the image recognition module may include a deep learning neural network that has been trained to recognize and identify various objects, including grocery store merchandise objects. The neural network may be configured to recognize the objects in the image (e.g., the hand 504, the bananas 502, paper towels 506, canned tomatoes 508, soda bottles 510, shelves 512, etc.) as well as to calculate confidence values and/or prominence values associated with the identified objects. The confidence values may indicate how confident the image recognition module is about the identification of the associated object. The prominence values may indicate the prominence of the associated objects in the image 500 based on a plurality of factors, such as the size of the object relative to the image size, the size of the object relative to the sizes of other objects in the image 500, the location of the object in the image 500 (i.e., near the center versus on the outskirts), the focus of the object (i.e., crisp versus blurry), the number of similar objects in the image 500, whether any portion of the object is obscured or blocked, the brightness of the object compared to the brightness of the image 500 or other objects in the image 500, etc.

Based on the image recognition module's identification of the objects in the image 500 and their rankings (e.g., based on their prominence values), the artificial intelligence engine 234 can determine the proper context of the user's contextual voice command. In this example scenario, the image recognition module may return a list of identified objects that includes the bananas 502 and a list of associated prominence values that includes the highest prominence value for the bananas 502. Accordingly, the artificial intelligence engine 234 may determine that the user's contextual voice command may be referring to the bananas 502 (as opposed to the paper towels 506, the canned tomatoes 508, the soda bottles 510, or the shelves 512). Therefore, the digital assistant module may, for example, remove bananas from the user's shopping list, inform the user 102 of the price of the bananas 502, inform the user 102 whether the bananas 502 are on sale, inform the user 102 of the price of bananas last week, inform the user 102 whether bananas are currently in his shopping list, or inform the user 102 of the price of bananas at the next closest grocery store, depending on the contextual voice command provided by the user 102. Furthermore, the digital assistant module may generate an auditory output that explicitly and specifically identifies the object in the environment that was indirectly referenced in the contextual voice command (i.e., "bananas" in this example) to provide the user 102 a confirmation that the backpack 101 perceived the environment and interpreted the contextual voice command correctly.

In another implementation, the artificial intelligence engine 234 may use the contextual signals in the voice command to further process the list of identified objects and their associated prominence values returned by the image recognition module. For instance, had the user 102 said, "Remove this fruit from my shopping list," the artificial intelligence engine 234 may register only the identified objects that fall into the fruit category even if there are non-fruit objects having higher prominence values identified in the image 500. Similarly, if the image 500 had included yellow bananas held up by the user's left hand and also included green bananas held up by the user's right hand, and the user 102 said "How much are the green ones?" the artificial intelligence engine 234 may consider only green-colored objects identified in the image 500 by the image recognition module.

The above description is an example of how the artificial intelligence engine 234 can use the image recognition module to determine the relevant context associated with the voice command provided by the user 102. The artificial intelligence engine 234 consistent with the present concepts may use other modules to determine the relevant context associated with the voice command by sensing the environment surrounding the user 102. For example, text in the user's environment, such as in books, menus, signs, posters, billboards, storefronts, facades, labels, etc., may be recognized by the text recognition module. The text recognition module may use, for example, optical character recognition (OCR) techniques, including accounting for distortions, such as skews, blurs, smudges, warps, wraps, gaps, turns, twists, etc. The text recognition module may also use machine learning techniques and be trained to recognize dates, proper nouns (i.e., names), certain languages, etc.

Furthermore, faces in the user's environment (such as, faces of pedestrians, faces of drivers, faces on posters, faces on billboards, faces on televisions, faces of pets, etc.) may be recognized by the facial recognition module. The recognized faces may be identified by referencing databases of known faces, such as address books with profile images for the contacts, social media networks, and photo galleries with identity tags. Accordingly, for example, the user 102 may be wearing the backpack 101 and standing in front of his friend Matt who just offered him a ride to the airport tomorrow. The user 102 can tell the backpack 101, "Hey Backpack, can you email Matt my flight itinerary?" Whereas a conventional digital assistant would have to ask the user 102 to specify which one of the dozen contacts in the user's address book with the name Matt, the backpack 101, consistent with the present concepts, can use the camera 110 and the facial recognition module to ascertain which Matt the user 102 is referring to in the contextual voice command. Indeed, the backpack 101 would have been able to correctly interpret the contextual voice command even if the user 102 had said "email my friend" or just "email him," because the backpack 101 can see what the user 102 sees, consistent with the present concepts. As another example, the user 102 may have met an associate at a business conference. The user 102 can simply say, "Hey Backpack, link this person in my professional social media network." In response, the backpack 101 may capture an image recording of the associate's face using the camera 110, search and find the associate's profile in the professional social media network, and connect the associate's profile to the user's account.

Similarly, sounds in the user's environment sensed by the microphone 112 may be interpreted by the audio recognition module. Where there are multiple simultaneous sounds, the audio recognition module may employ one or more filtering techniques, consider the relative volumes of the different sounds, and/or consider the contextual signals in the user's voice command (e.g., "What animal sound is that?" "Who sings this song?" etc.). The audio recognition module may be configured to recognize various types of sounds based on a set of rules and/or trained to recognize various types of sounds using training data of known sounds. Where the backpack 101 includes multiple microphones 112 positioned to pick up sounds emanating from different directions, the audio recognition module may be configured to weigh sounds according to their direction. For example, sounds coming from the front of the user 102 may be given more weight compared to sounds coming from behind the user 102.

The artificial intelligence engine 234 may use the speech recognition module to recognize speech from the audio recording made of the sounds in the user's environment by the microphone 112. The speech recognition module may use rules-based techniques (e.g., grammatical rules) and/or machine learning-based techniques. The speech recognition module may be personally tailored or trained to better recognize the speech of the user 102 or more generally configured to better recognize the local dialect and/or language associated with the user 102 or the user's geographical location.

The artificial intelligence engine 234 may use the cognitive module to interpret and understand the contextual voice command provided by the user 102. In some implementations, the cognitive module may include natural language processing capabilities as well as human-computer interaction reasoning functionalities. Accordingly, the cognitive module can detect any contextual signals that refer to the user's environment and interpret contextual voice commands. The cognitive module may use other modules (e.g., the computer vision module or audio recognition module) to perceive the environment. The cognitive module can also decide what computerized task should be performed in response to the voice command. In one implementation, the cognitive module can use the digital assistant module to carry out the computerized task. The cognitive module may be implemented based on defined rules and/or machine learning. Furthermore, the cognitive module may be continuously modified, for example, continuously learning based the behavior of the user 102.

The digital assistant module may be capable of performing a myriad of computerized tasks, such as, executing commands, answering queries, searching for information, saving data, prompting users, etc. The digital assistant module may have access to various data sources, including the Internet, search engines, databases, social networks, the user's calendar, the user's address book, the user's task list, the user's shopping list, the user's accounts at various web sites, etc. The user 102 may personalize the digital assistant module or change relevant settings, such as selecting the voice, language, and/or dialect of the digital assistant module; adjust the level of prompts, etc.

Figure 6:
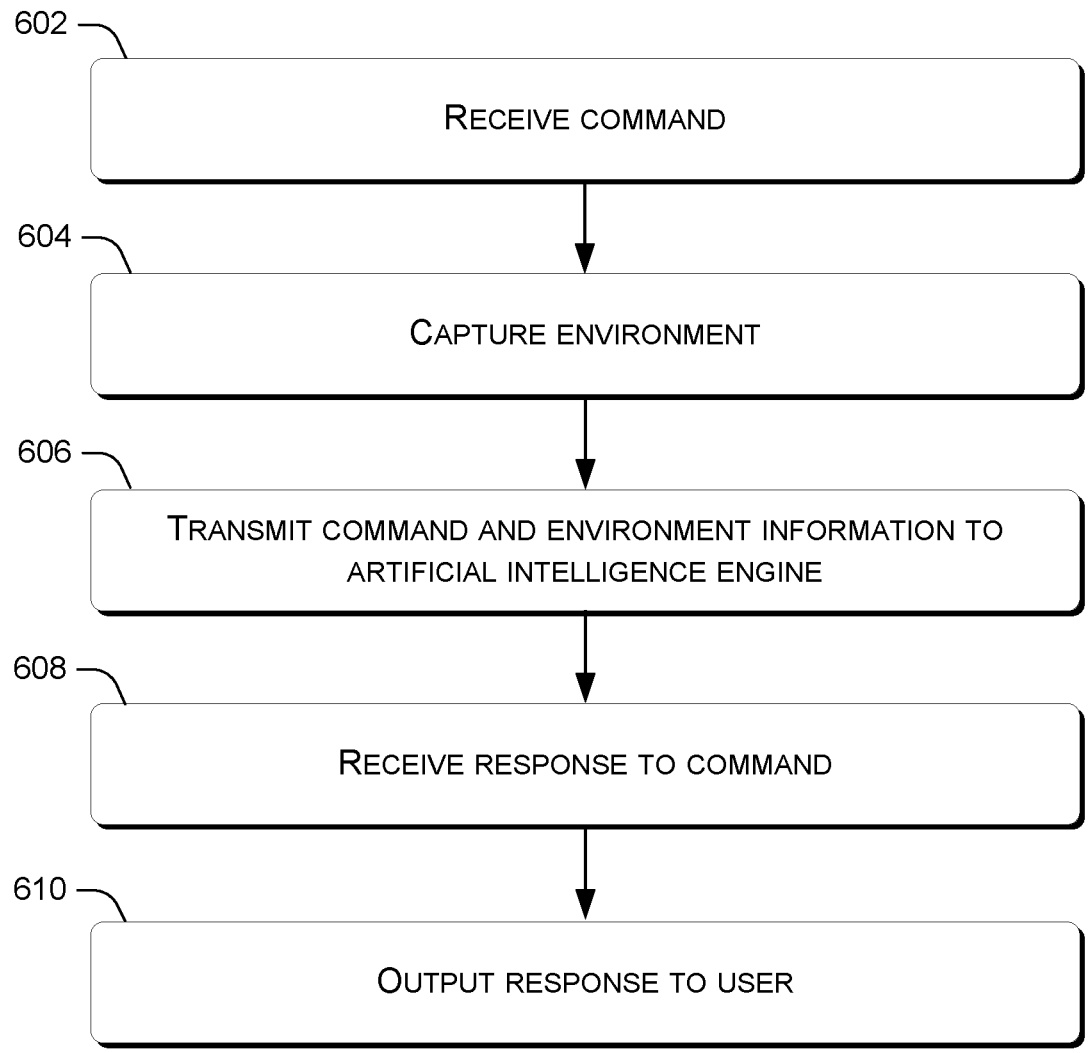
FIGS. 6 and 7 show flowcharts illustrating example methods, consistent with the present concepts.

FIG. 6 shows a flowchart illustrating an example wearable method 600, consistent with the present concepts. For example, the wearable method 600 may be performed by a wearable, such as the backpack 101 or any other wearable, consistent with the present concepts.

In act 602, a command may be received. The command may include a request to perform a particular computerized task. The command may include a query seeking certain information. The command may be a contextual command that relates to an environment surrounding a user. That is, the command may include a contextual signal, such as a reference or a cue (e.g., a pronoun) relating to something about the environment. The command may have been provided by a user wearing the wearable and talking into a microphone on the wearable, or provided by the user via any other means.

In act 604, the environment may be sensed. For instance, a recording of the environment may be captured using one or more sensors. For example, the environment may be visually sensed by capturing a video recording using a camera, auditorily sensed by capturing an audio recording using a microphone, or sensed in any other way possible based on the capabilities of the available sensors. Accordingly, information about the environment may be included in a recording.

In act 606, the command and the sensed environment information may be transmitted to an artificial intelligence engine. For example, a recording of the command (e.g., an audio recording or a textual recording) as well as a recording of the environment (e.g., an image recording or a video recording) may be transmitted to the artificial intelligence engine. Where the artificial intelligence engine resides remotely from the wearable, the transmission may occur through one or more networks.

In act 608, a response to the command may be received. For instance, the response may be received from the artificial intelligence engine as a result of the command provided to it. Where the artificial intelligence engine is remote from the wearable, the response may be received through one or more networks. The response may be an answer to the query, an acknowledgment that the request has been executed, and/or a prompt to the user seeking clarification or more information. The response may include visual feedback, auditory feedback, and/or haptic feedback.

In act 610, the response may be output to the user. The response may be output using one or more output components of the wearable, or the response may be output using one or more output components that are accessible by the wearable.

Figure 7:
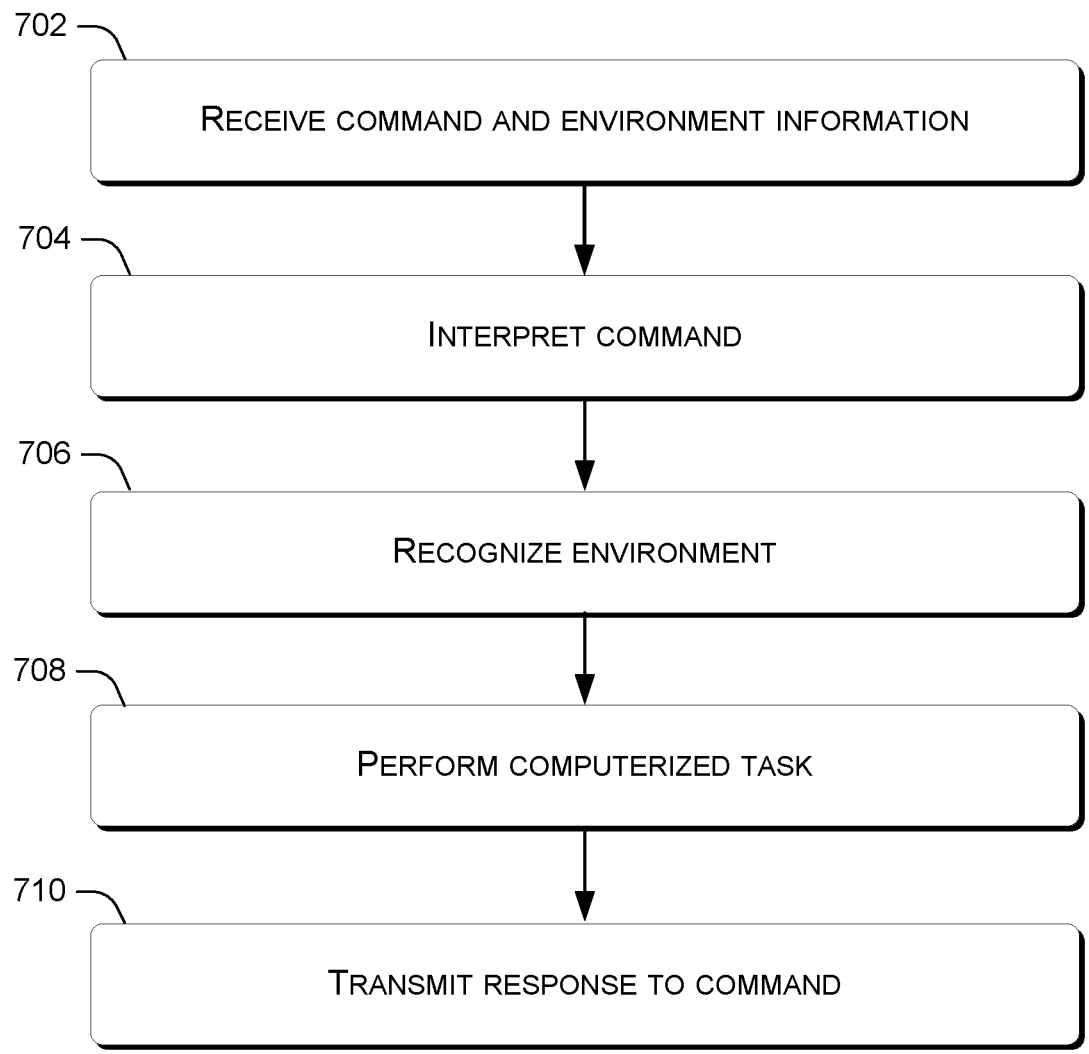

FIG. 7 shows a flowchart illustrating an example server method 700, consistent with the present concepts. For example, the server method 700 may be performed by one or more server devices, such as the server 206 that include the artificial intelligence engine 234 or any other device, consistent with the present concepts.

In act 702, a command and information about the environment may be received. For example, the command received in act 702 may be the command transmitted in act 606, and the environment information received in act 702 may be the environment information transmitted in act 606. Where the wearable and/or the sensors that received the command and/or the environment information reside remotely, the command and the environment information may be received through one or more networks. The command may include a request to perform a particular computerized task. The command may include a query seeking certain information. The command may be a contextual command that relates to an environment surrounding a user. That is, the command may include a contextual signal, such as a reference or a cue, relating to something about the environment. The command may have been provided by a user wearing the wearable and talking into a microphone on the wearable, or provide by the user via any other means. The command may be received in the form of an audio recording or a textual recording. Furthermore, the environment information may be received in the form of a recording captured using one or more sensors. For example, the environment may be visually sensed by capturing a video recording using a camera, auditorily sensed by capturing an audio recording using a microphone, or sensed in any other way possible based on the capabilities of the available sensors.

In act 704, the command may be interpreted. For example, an audio recording of the command may be converted into text using speech recognition. The text of the command may be further interpreted using a cognitive service to determine the meaning of the command, e.g., a request for a computerized action, a query seeking information, etc. Furthermore, consistent with the present concepts, a contextual signal in the command may be detected, where the contextual signal references the environment and/or the context associated with the command.

In act 706, the environment may be recognized. For example, computer vision may be used to recognize the environment from a visual recording of the environment. For instance, image recognition can be used to recognize objects in the environment, facial recognition may be used to recognize faces in the environment, and/or text recognition may be used to recognize text in the environment. Similarly, audio recognition may be used to recognize sounds in the environment.

In act 708, a computerized task may be performed. For instance, a cognitive service may determine a computerized task that should be performed based on the interpretation of the command and/or the recognition of the environment. Further, a digital assistant may perform the determined computerized task. The computerized task may be a contextual task that relates to the environment. As explained above, the digital assistant may be capable of performing a wide range of tasks, so long as the digital assistant has access to information and/or data necessary to perform the tasks.

In act 710, a response to the command may be transmitted. For example, the digital assistant may generate a response based on the command and/or the computerized task. The response may be transmitted to be output to the user who provided the command. The response transmitted in act 710 may be the response received in act 608. The response may be an answer to a query, an acknowledgment that a request has been executed, and/or a prompt to the user seeking clarification or more information. The response may include visual feedback, auditory feedback, and/or haptic feedback. Where the wearable is located remotely, the response may be transmitted through one or more networks.

The methods described above (including the wearable method 600 and the server method 700) and the acts thereof can be performed by any system, device, and/or component described above, and/or by any other system, device, and/or components capable of performing the described methods or acts. The methods can be implemented in any suitable hardware, software, firmware, or combination thereof. For example, the methods may be stored on one or more computer-readable storage media as a set of instructions (e.g., computer-readable instructions or computer-executable instructions) such that execution by a processor of a computing device causes the computing device to perform the method. The order in which the methods and acts are described is not intended to be construed as a limitation, and any of the described methods and/or acts can be combined in any order to implement the methods and/or act, or alternate methods and/or acts.

Various examples are described above. Although the subject matter has been described in language specific to structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

Additional examples are described below. One example includes a backpack comprising a strap including a camera that faces a front direction of a user when the user wears the backpack, a microphone, a speaker, a network interface, and a processor. The backpack also comprises a storage having instructions which, when executed by the processor, cause the processor to: receive a contextual voice command from the user via the microphone, the contextual voice command using a non-explicit reference to an object in an environment, capture an image of the environment including the object via the camera, transmit the contextual voice command and the image to an artificial intelligence engine via the network interface to cause a contextual task to be performed, the contextual task including a computerized action relating to the object, receive a response associated with the contextual task that was performed based at least on the contextual voice command, and output the response to the user via the speaker.

Another example can include any of the above and/or below examples where the backpack further comprises a compass, where the instructions further cause the processor to sense a direction that the user is facing via the compass.

Another example can include any of the above and/or below examples where the backpack further comprises a global positioning system (GPS) unit, where the instructions further cause the processor to determine a location of the user via the GPS unit.

Another example includes a system comprising a wearable, a sensor attached to the wearable, the sensor being fixed relative to a body of a user and capable of sensing an environment, and a processor. The system also comprises a storage having instructions which, when executed by the processor, cause the processor to: receive a contextual voice command that includes a pronoun to refer to an object in the environment, detect the object in the environment using the sensor, cause an artificial intelligence engine to perform a contextual task relating to the object in response to the contextual voice command, and output a response associated with the contextual task to the user.

Another example can include any of the above and/or below examples where the wearable includes a backpack.

Another example can include any of the above and/or below examples where the sensor includes a camera.

Another example can include any of the above and/or below examples where the camera is located in a strap of the wearable and facing a front direction of the user.

Another example can include any of the above and/or below examples where the system further comprises a speaker for outputting the response, wherein the response includes auditory feedback.

Another example can include any of the above and/or below examples where the system further comprises a light emitting diode for outputting the response, wherein the response includes visual feedback.

Another example can include any of the above and/or below examples where the system further comprises a haptic actuator for outputting the response, wherein the response includes haptic feedback.

Another example can include any of the above and/or below examples where the system further comprises a network interface for connecting to a network through a companion device that is capable of connecting to the network.

Another example can include any of the above and/or below examples where the system further comprises a battery for charging a companion device.

Another example includes a method comprising receiving a contextual voice command that references an object in an environment without explicitly identifying the object, capturing a recording of the environment including the object, using an artificial intelligence engine to determine an identification of the object and to interpret the contextual voice command based at least on the identification of the object, and causing a contextual task to be performed in response to the contextual voice command, the contextual task including a computerized action relating to the object in the environment.

Another example can include any of the above and/or below examples where the method further comprises using a speech recognition module to interpret the contextual voice command.

Another example can include any of the above and/or below examples where the recording includes one or more of: an audio recording, an image recording, and/or a video recording.

Another example can include any of the above and/or below examples where the method further comprises using an image recognition module to determine the identification of the object in the recording.

Another example can include any of the above and/or below examples where the method further comprises using a text recognition module to determine the identification of the object in the recording.

Another example can include any of the above and/or below examples where the method further comprises using a facial recognition module to determine the identification of the object in the recording.

Another example can include any of the above and/or below examples where the method further comprises using a cognitive module to determine the contextual task to be performed in response to the contextual voice command.

Another example can include any of the above and/or below examples where the method further comprises generating a response associated with the contextual task and transmitting the response to be output to a user.

The invention claimed is:

1. A backpack, comprising:
a strap including a camera that faces a front direction of a user when the user wears the backpack;
a microphone;
a speaker;
a network interface;
a processor; and
a storage having instructions which, when executed by the processor, cause the processor to:
receive a voice command from the user via the microphone, the voice command using a non-explicit reference to an object in an environment, wherein the non-explicit reference is a contextual signal that the voice command is a contextual voice command and that the contextual voice command references the environment;
capture an image of the environment including the object via the camera;
transmit the contextual voice command and the image to an artificial intelligence engine via the network interface to cause a contextual task to be performed, the contextual task including a computerized action relating to the object;
receive a response associated with the contextual task that was performed based at least on the contextual voice command; and
output the response to the user via the speaker.

2. The backpack of claim 1, further comprising:
a compass,
wherein the instructions further cause the processor to sense a direction that the user is facing via the compass.

3. The backpack of claim 1, further comprising:
a global positioning system (GPS) unit,
wherein the instructions further cause the processor to determine a location of the user via the GPS unit.

4. A system, comprising:
a wearable;
a sensor attached to the wearable, the sensor being fixed relative to a body of a user and capable of sensing an environment;
a processor; and
a storage having instructions which, when executed by the processor, cause the processor to:
receive a voice command that includes a pronoun that refers to an object in the environment, wherein the pronoun is a contextual signal that the voice command is a contextual voice command and that the contextual voice command references the environment;
detect the object in the environment using the sensor;
cause an artificial intelligence engine to perform a contextual task relating to the object in response to the contextual voice command; and
output a response associated with the contextual task to the user.

5. The system of claim 4, wherein the wearable includes a backpack.

6. The system of claim 4, wherein the sensor includes a camera.

7. The system of claim 6, wherein the camera is located in a strap of the wearable and facing a front direction of the user.

8. The system of claim 4, further comprising:
a speaker for outputting the response, wherein the response includes auditory feedback.

9. The system of claim 4, further comprising:
a light emitting diode for outputting the response, wherein the response includes visual feedback.

10. The system of claim 4, further comprising:
a haptic actuator for outputting the response, wherein the response includes haptic feedback.

11. The system of claim 4, further comprising:
a network interface for connecting to a network through a companion device that is capable of connecting to the network.

12. The system of claim 4, further comprising:
a battery for charging a companion device.

13. A method, comprising:
receiving a voice command that makes a reference to an object in an environment without explicitly identifying the object, wherein the reference is a contextual signal that the voice command is a contextual voice command and that the contextual voice command references the environment;
capturing a recording of the environment including the object;
using an artificial intelligence engine to determine an identification of the object and to interpret the contextual voice command based at least on the identification of the object; and
causing a contextual task to be performed in response to the contextual voice command, the contextual task including a computerized action relating to the object in the environment.

14. The method of claim 13, further comprising:
using a speech recognition module to interpret the contextual voice command.

15. The method of claim 13, wherein the recording includes one or more of:
an audio recording, an image recording, and/or a video recording.

16. The method of claim 13, further comprising:
using an image recognition module to determine the identification of the object in the recording.

17. The method of claim 13, further comprising:
using a text recognition module to determine the identification of the object in the recording.

18. The method of claim 13, further comprising:
using a facial recognition module to determine the identification of the object in the recording.

19. The method of claim 13, further comprising:
using a cognitive module to determine the contextual task to be performed in response to the contextual voice command.

20. The method of claim 13, further comprising:
generating a response associated with the contextual task; and
transmitting the response to be output to a user.

* * * * *